United States Patent [19]

Form

[11] Patent Number: 4,632,544
[45] Date of Patent: Dec. 30, 1986

[54] OPTICAL CABLE TESTING

[75] Inventor: Ernst Form, Sulzbach/Murr, Fed. Rep. of Germany

[73] Assignee: ANT Nachrichtentechnik GmbH, Backnang, Fed. Rep. of Germany

[21] Appl. No.: 746,501

[22] Filed: Jun. 14, 1985

[30] Foreign Application Priority Data

Jun. 16, 1984 [DE] Fed. Rep. of Germany ....... 3422513

[51] Int. Cl.$^4$ ...................... G01N 21/84; G01N 21/88
[52] U.S. Cl. .................................. 356/73.1; 356/432
[58] Field of Search ........................ 356/73.1, 239, 432

[56] References Cited

FOREIGN PATENT DOCUMENTS

| 2510267 | 1/1983 | France. | |
| 1560124 | 1/1980 | United Kingdom | 356/73.1 |
| 2092743 | 8/1982 | United Kingdom | 356/73.1 |

Primary Examiner—Vincent P. McGraw
Attorney, Agent, or Firm—Spencer & Frank

[57] ABSTRACT

Method and apparatus for detecting defects in an optical cable composed of a series of cable units. Light pulses are sent through one cable conductor and returned to the starting end via a second conductor and an electrical signal representative of the light intensity exiting the second conductor is derived. The electrical signal is applied to a sensitivity control circuit which is switched through a succession of sensitivity levels starting from a minimum level and proceeding to a maximum level. Each sensitivity level corresponds to the attenuation produced by a cable composed of a given number of cable units and is associated with a particular ratio between the output signal provided by the sensitivity control circuit and the electrical signal applied thereto. Switching continues until the output signal provided by the sensitivity control circuit exceeds a selected threshold value, and the number of levels through which the sensitivity control circuit has been switched until that output signal has been reached is displayed.

4 Claims, 1 Drawing Figure

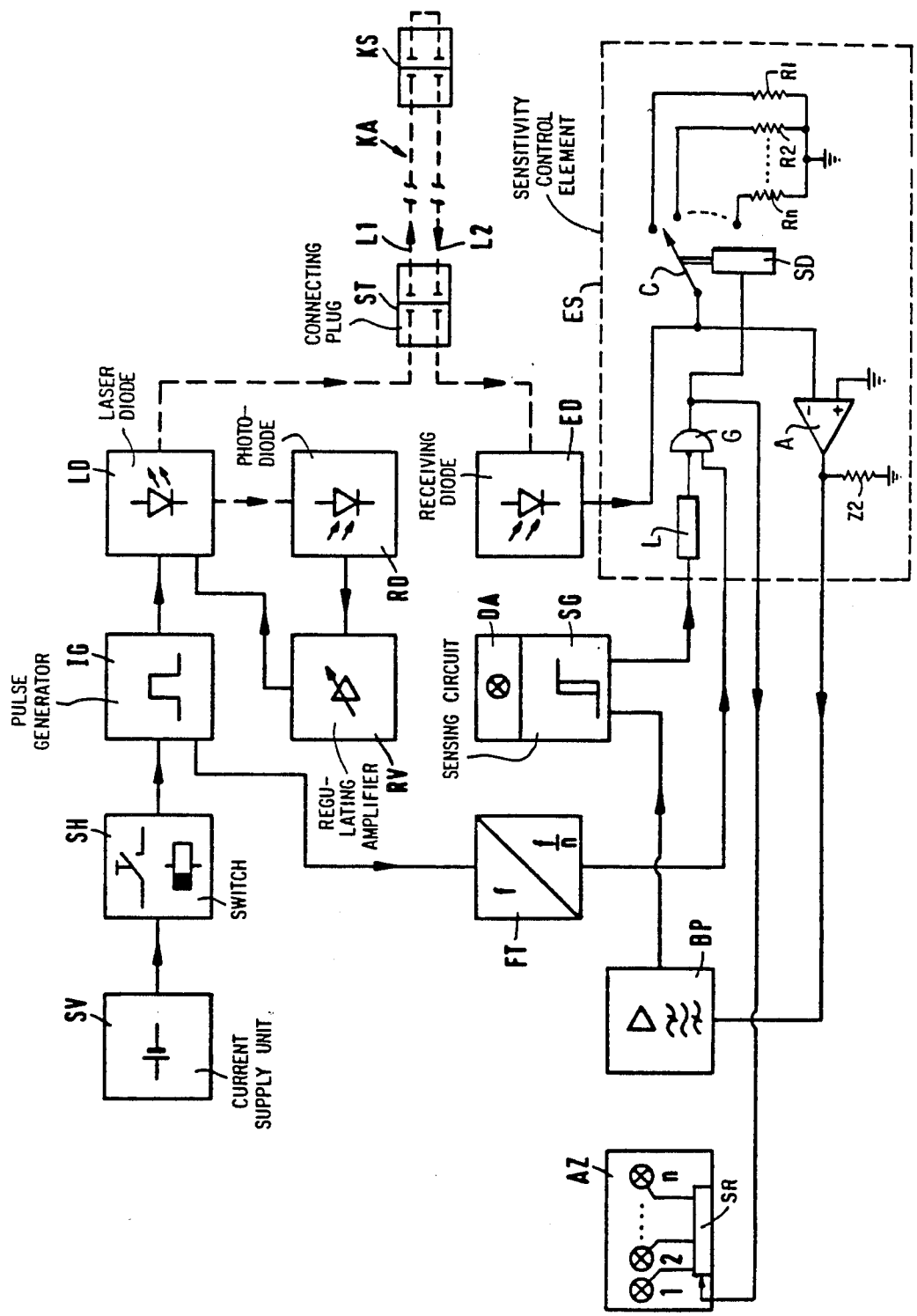

OPTICAL CABLE TESTING

BACKGROUND OF THE INVENTION

The present invention relates to a method and circuit device for checking an optical cable for the passage of light and undue increases in attenuation caused by defects, with the attenuation per unit length of an identical undamaged optical fiber cable being known.

An installed optical cable is customarily composed of a series of individual cable length units (e.g., each 1 km in length). After installation of each cable length unit, it is necessary to check the entire cable, including the last installed length unit, for the passage of light and to determine precisely whether the installed cable has unduly high attenuation caused, e.g., by a break in a conductor or a defective splice or plug-in connection.

SUMMARY OF THE INVENTION

It is an object of the present invention to provide a simple, quickly implemented method and an advantageous circuit device for effecting such an optical cable check.

The above and other objects are achieved, according to the present invention, by a method and apparatus for testing an optical cable having a proximate end and a remote end, the cable being composed of a selected number of cable units, each of given length, connected together in series, and the cable containing at least two optical conductors extending between the proximate and remote ends of the cable, in order to monitor light transmission and undue attenuation increases caused by defects, based upon the known attenuation of one cable unit which is not defective, by:

- optically conductively connecting together two of the optical conductors at the remote end of the cable;
- supplying a succession of light pulses to a first one of the two optical conductors at the proximate end of the cable so that the light pulses traverse the first one of the two optical conductors to the remote end of the cable and then traverse the other one of the two optical conductors from the remote end to the proximate end of the cable;
- deriving from the light arriving at the proximate end of the cable via the other one of the two optical conductors an electrical signal proportional in value to the arriving light intensity;
- supplying the electrical signal to a sensitivity control element switchable between a plurality of different sensitivity levels corresponding in number to the maximum possible number of cable units in the cable, with each sensitivity level corresponding to the light intensity attenuation produced by a respective number of cable units, such that at a given sensitivity level the sensitivity control element produces an output signal which exceeds a given value when the two optical conductors are free of defects and the number of connected cable units is equal to or less than the number of units corresponding to the given sensitivity level, and which does not exceed the given value when the number of connected cable units is greater than the number of units corresponding to the given sensitivity level;
- monitoring the output signal produced by the sensitivity control element while switching the sensitivity control element to successive sensitivity levels, starting from the level of lowest sensitivity and proceeding to the level of highest sensitivity;
- counting the number of sensitivity levels to which the sensitivity control element is switched until the output signal exceeds the given value; and
- displaying the number of sensitivity levels which have been counted, whereby
- a display of a number of counted sensitivity levels which is greater than the selected number of cable units is an indication of a defect in the cable.

The present invention will now be described in greater detail with reference to a preferred embodiment which is illustrated in the drawing.

BRIEF DESCRIPTION OF THE DRAWING

The sole drawing FIGURE is a block circuit diagram of a preferred embodiment of a circuit for checking an optical cable KA for light transmitting capability and undue attenuation increases caused by defects, according to the invention.

DESCRIPTION OF THE PREFERRED EMBODIMENTS

Upon closing of a switch SH, a current supply unit SV is connected to a pulse generator IG which emits a train of electrical pulses to a laser diode LD at a repetition rate of, e.g., 80 Hz and with a pulse width of, e.g., 1 ms.

The corresponding train of light pulses generated by laser diode LD is fed into an optical conductor L1 of a cable KA connected to the testing device via a connecting plug ST. In order for the output power of laser diode LD to remain constant, there is provided a control loop composed of a photodiode RD which derives an electrical signal from the light output of laser diode LD and a regulating amplifier RV which, controlled by the electrical output signal of photodiode RD, regulates the operating power and thus the intensity of the light output of laser diode LD.

At its remote end, cable KA is bridged by means of a light short-circuit plug KS so that the train of light pulses fed into optical conductor L1 is returned to plug ST via a second optical conductor L2.

A receiving diode ED converts the train of light pulses arriving at plug ST from the second optical conductor L2 to a corresponding electrical signal. This signal is then conducted through a sensitivity control element ES which is designed as an impedance converter and includes an input resistor Z1 and a constant output resistor Z2. The input resistor Z1 is equipped to exhibit differing resistance stages R1, R2 . . . Rn, or values, so that sensitivity control element ES can be switched to various sensitivity stages, or levels. The same number of sensitivity stages should be provided as there are cable length units interconnected in one installed cable.

During a checking process, sensitivity control element ES is stepped up by a sensitivity value proportional to the known attenuation of a cable length unit, beginning at the lowest sensitivity stage which corresponds to one length unit. The switching frequency (approximately 2 Hz) for sensitivity control element ES is derived by means of a frequency divider FT from the pulse repetition rate of pulse generator IG.

The output signal of sensitivity control element ES is fed, via a bandpass filter BP tuned to the pulse repetition rate of generator IG, to a sensing circuit SG having a selected response threshold. The threshold of circuit SG and the sensitivity stages of sensitivity control element ES together are set to the known attenuation of an undamaged cable length unit so that the output signal of sensitivity control element ES will exceed the threshold level of circuit SG whenever the presently selected sensitivity stage of sensitivity control element ES corresponds to the number of series-connected, undamaged, cable length units. If, thus, the cable is composed of only one undamaged length unit, the output signal of sensitivity control element ES will exceed the threshold at the first, lowest sensitivity stage; if the cable is composed of two undamaged length units, the output signal of sensitivity control element ES will exceed the threshold at the second, next higher sensitivity stage. For n undamaged cable length units, the output signal of sensitivity control element ES exceeds the threshold when the $n^{th}$ sensitivity stage is switched on.

Every time the output signal of the sensitivity control element exceeds the threshold, a transmission indicator DA lights up because then the cable has transmitted at least part of the light fed into optical conductor L1 to the output of optical conductor L2 and thus there is no interruption. As soon as the output signal of sensitivity control element ES exceeds the threshold, generator SG not only actuates the transmission indicator DA, but also stops the further upward switching of sensitivity control element ES.

At the moment when the upward switching of sensitivity control element ES is stopped, a display unit AZ, which counts the successively switched-on sensitivity stages and causes one diode of a chain of LED's 1, 2, . . . , n to light up for each switched-on sensitivity stage, ceases to count.

If all length units of the cable checked according to the above-described process are free of defects and exhibit their normal attenuation, the number of successively switched-on sensitivity stages as displayed on display unit AZ coincides with the actual number of cable length units installed. If, however, there is a difference between the display and the number of installed cable lengths, the unduly high attenuation in the cable must have been caused by a defect in the installed cable. Due to the excessive attenuation of the cable, sensitivity control element ES will have switched up by more sensitivity stages than it would for an undamaged cable with normal attenuation and consequently it indicates a higher number than corresponds to the actual number of cable lengths installed.

As shown in the FIGURE, the sensitivity control element ES which is designed as an impedance converter includes a differential amplifier A with several parallel-connected input resistors R1, R2 . . . Rn and a constant output resistor Z2. Each of these resistors R1, R2 . . . Rn is associated with a respective sensitivity level. Resistor R1 is here associated with the lowest sensitivity level and resistor Rn is associated with the highest sensitivity level. A movable contact C is connected to the output of diode ED and is movable from one input resistor to the next under control of a switching device SD. Device SD is actuated by switching pulses supplied by frequency divider FT via an AND gate G.

Gate G has a positive input connected to divider FT and a negated input connected to sensing circuit SG via a latch circuit L. The first pulse conducted by gate G connects contact C to input resistor R1.

Thus, movable contact C will switch from one input resistor to the next, starting with resistor R1, in response to each pulse from divider FT until sensing circuit SG produces an output signal, whereupon latch circuit L will produce a constant signal disabling gate G.

Each pulse conducted via gate G is supplied to display unit AZ which, in the illustrated embodiment, includes a simple shift register SR having a plurality of stages each connected to actuate a respective LED. Each pulse supplied to register SR is shifted from one stage to the next in response to each subsequently arriving pulse so that when sensing circuit SG produces an output signal, the number of LED's illuminated corresponds to the number of pulses passed by gate G and thus to the number of switching steps executed by contact C. Thus, in effect, register SR performs a counting operation.

It will be understood that the above description of the present invention is susceptible to various modifications, changes and adaptations, and the same are intended to be comprehended within the meaning and range of equivalents of the appended claims.

What is claimed is:

1. Method for testing an optical cable having a proximate end and a remote end, the cable being composed of a selected number of cable units, each of given length, connected together in series, and the cable containing at least two optical conductors extending between the proximate and remote ends of the cable, the method serving to monitor light transmission and undue attenuation increases caused by defects, based upon the known attenuation of one cable unit which is not defective, comprising:
  optically conductively connecting together two of the optical conductors at the remote end of the cable;
  supplying a succession of light pulses to a first one of the two optical conductors at the proximate end of the cable so that the light pulses traverse the first one of the two optical conductors to the remote end of the cable and then traverse the other one of the two optical conductors from the remote end to the proximate end of the cable;
  deriving from the light arriving at the proximate end of the cable via the other one of the two optical conductors an electrical signal proportional in value to the arriving light intensity;
  supplying the electrical signal to a sensitivity control element switchable between a plurality of different sensitivity levels corresponding in number to the maximum possible number of cable units in the cable, with each sensitivity level corresponding to the light intensity attenuation produced by a respective number of cable units, such that at a given sensitivity level the sensitivity control element produces an output signal which exceeds a given value when the two optical conductors are free of defects and the number of connected cable units is equal to or less than the number of units corresponding to the given sensitivity level, and which does not exceed the given value when the number of connected cable units is greater than the number of units corresponding to the given sensitivity level;
  monitoring the output signal produced by the sensitivity control element while switching the sensitivity control element to successive sensitivity levels, starting from the level of lowest sensitivity and proceeding to the level of highest sensitivity;

counting the number of sensitivity levels to which the sensitivity control element is switched until the output signal exceeds the given value; and displaying the number of sensitivity levels which have been counted, whereby a display of a number of counted sensitivity levels which is greater than the selected number of cable units is an indication of a defect in the cable.

2. Method as defined in claim 1 wherein said step of switching is carried out under control of clock pulses derived from the repetition rate of the light pulses.

3. Circuit for testing an optical cable having a proximate end and a remote end, the cable being composed of a selected number of cable units, each of given length, connected together in series, and the cable containing at least two optical conductors extending between the proximate and remote ends of the cable, the circuit serving to monitor light transmission and undue attenuation increases caused by defects, based upon the known attenuation of one cable unit which is not defective, comprising:

means for optically conductively connecting together two of the optical conductors at the remote end of the cable;

means connectable for supplying a succession of light pulses to a first one of the two optical conductors at the proximate end of the cable so that the light pulses traverse the first one of the two optical conductors to the remote end of the cable and then traverse the other one of the two optical conductors from the remote end to the proximate end of the cable;

means connectable to the proximate end of the cable for deriving from the light arriving at the proximate end of the cable via the other one of the two optical conductors an electrical signal proportional in intensity to the arriving light intensity;

sensitivity control means having an input for receiving the electrical signal and switchable between a plurality of different sensitivity levels corresponding in number to the maximum possible number of cable units in the cable, with each sensitivity level corresponding to the light intensity attenuation produced by a respective number of cable units such that at a given sensitivity level, said sensitivity control means produces an output signal which exceeds a given value when the two optical conductors are free of defects and the number of connected cable units is equal to or less than the number of units corresponding to the given sensitivity level, and which does not exceed the given value when the number of connected cable units is greater than the number of units corresponding to the given sensitivity level, said sensitivity control means being an impedance converter comprising input resistance means switchable between a plurality of resistance values each corresponding to a respective sensitivity level, output resistance means having a constant resistance and connected to said input resistance means, input means for supplying the electrical signal to said input resistance means, and output means for deriving the output signal from said output resistance means;

means connected for monitoring the output signal produced by said sensitivity control means;

means connected for switching said sensitivity control means to successive sensitivity levels, starting from the level of lowest sensitivity and proceeding to the level of highest sensitivity;

means connected for counting the number of sensitivity levels to which said sensitivity control means is switched until the output signal exceeds the given value; and means connected to said counting means for displaying the number of sensitivity levels which have been counted, whereby a display of a number of counted sensitivity levels which is greater than the selected number of cable units is an indication of a defect in the cable.

4. Circuit arrangement as defined in claim 3 wherein said means for displaying comprise a plurality of light emitting diodes and means for illuminating a selected number of said diodes corresponding to the number of sensitivity levels counted by said counting means.

* * * * *